July 7, 1964  J. RÖDER  3,139,974
VIBRATING CONVEYOR
Filed Nov. 24, 1961  2 Sheets-Sheet 1
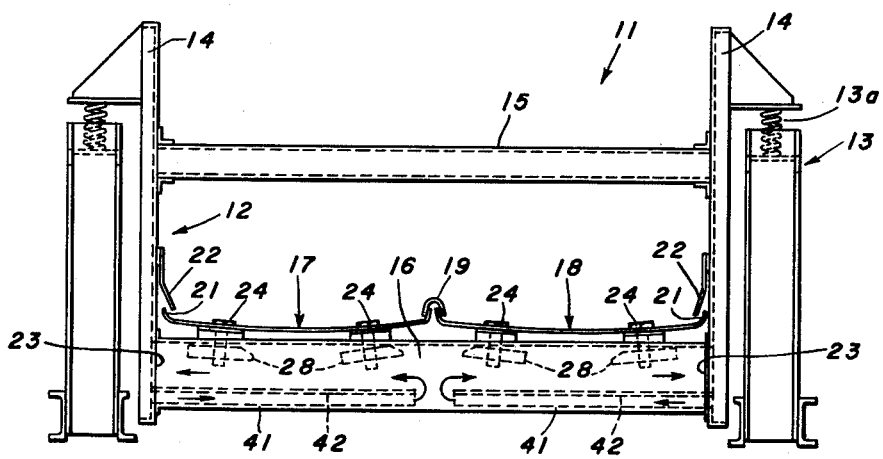
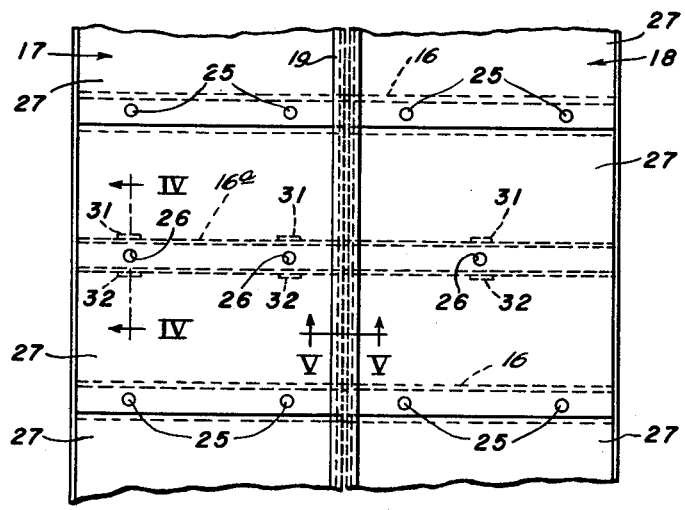
INVENTOR.
JOSEF RÖDER
BY
Attorneys

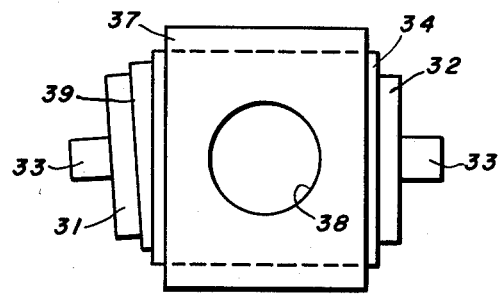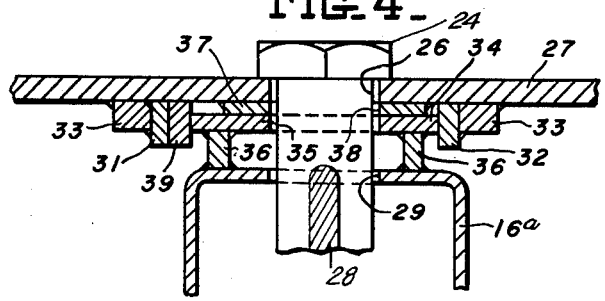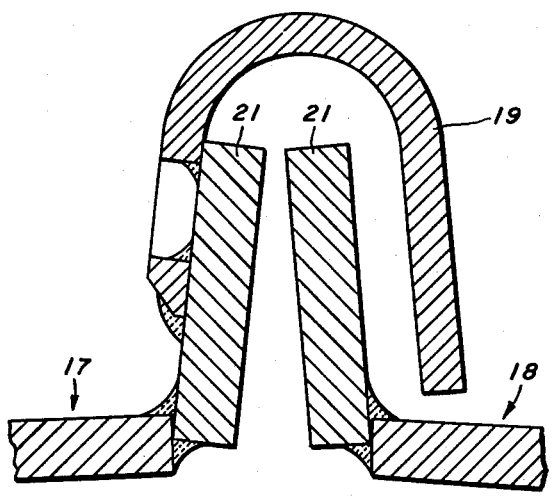

United States Patent Office 3,139,974
Patented July 7, 1964

3,139,974
VIBRATING CONVEYOR
Josef Röder, Darmstadt, Germany, assignor to Dravo Corporation, Pittsburgh, Pa., a corporation of Pennsylvania
Filed Nov. 24, 1961, Ser. No. 154,434
Claims priority, application Germany Dec. 2, 1960
7 Claims. (Cl. 198—220)

This invention relates generally to vibrating conveyors, and, more particularly, to a vibrating conveyor for handling hot material which causes thermal expansion of the conveyor structural elements.

In handling bulk material vibrating conveyors or screens are extensively used. Where the material is very hot, as in the case of sintered ore from a sintering machine, the component parts of the conveyor are subjected to severe thermal stresses, because of the heating and cooling of the apparatus and because of unequal heating and cooling of component parts, resulting in loosening of bolts or fastenings. As a result of such loosening the capability is lessening for these parts to absorb or transmit adequately the mass forces inherent in the vibratory action, and the conveyor or screens, as the case may be, diminishes its effectiveness. Consequently, the conveyor system must then be shut down for tightening of the parts together.

The tightening of the parts requires that the apparatus be cooled to a temperature where the necessary work can be accomplished without danger of severe discomfort to the workmen. Since operating temperatures encountered in such apparatus may be of the order of 1000° C., this cooling down time may be quite extensive and may require the shut down of other related machines. Generally, stoppage of a conveyor in a manufacturing operation interrupts the manufacturing process until the conveyor is returned to action, and such lost time, therefore, represents a costly delay.

The present invention obviates the breakdown of vibrating conveyors, caused by loosening of conveyor elements when used to convey hot material, by the provision of an articulated conveyor tray or pan and support structure therefore which are suspended freely for vibration in a longitudinal plane by conventional means. The conveyor tray or pan is composed of a plurality of elongated plates or sheets which overlap one another at their ends to extend the longitudinal dimension of the tray, and the overlapping ends are fastened to underlying crosspieces in a manner to allow relative horizontal movement of the sheets caused by thermal expansion. A rigid connection of one or more sheets are made to other underlying crosspieces to avoid longitudinal movement of the sheet as a unit from its position in the aligned plurality of sheets comprising the conveyor tray. Although the connection of the overlapping ends of the sheets allows relative movement between the adjacent sheets to compensate for thermal expansion in a horizontal plane, the connection is firm enough to hold the sheets together for vibratory movement of the plurality of sheets as a unitary tray.

It is an object of this invention to provide conveyor structure which is articulated to compensate for thermal expansion whereby buckling by heat of the joined structure is avoided.

Another object is the provision of a vibrating conveyor having an articulated tray and support structure therefor fastened to position the articulations in position relative to one another while compensating for expansion of the articulations.

A further object is to provide a conveyor which is formed to uniformly distribute thermal expansion of its components while maintaining structural rigidity of the conveyor.

A complete understanding of the invention may be had from the following detailed description of a specific embodiment thereof when read in conjunction with the appended drawings, wherein:

FIG. 1 represents in cross-sectional view the conveyor structure;

FIGS. 2A and 2B are fragmentary plan views of the conveyor trays shown in cross-section in FIG. 1;

FIG. 3 is a plan view showing the relative positioning between connection members fixing movement of the tray in a longitudinal direction;

FIG. 4 is a cross-section along line IV—IV of FIG. 2A showing details of the fixed connection between a tray and a crosspiece here shown fragmentarily; and FIG. 5 is a cross-section along line V—V of FIGS. 2A and 2B showing the shielding between adjacent trays.

Referring now to the drawings, wherein like reference characters designate like or corresponding parts throughout the several views, there is shown in FIG. 1, which illustrates a preferred embodiment, a vibrating conveyor system indicated generally at 11 which includes a conveyor indicated generally at 12 and support structure indicated generally at 13 with springs 13a by means of which the conveyor 12 is suspended for free vibratory action upon the support 13.

The conveyor 12 has two longitudinally extending vertically disposed sidepieces 14 disposed in spaced parallel relationship by crossbraces 15 attached by suitable means, not shown, to the sidepieces 14 near their uppermost portion. Crosspieces 16 are shown in FIG. 1 as connected at their ends to the lowermost portion of the sidepieces 14. Supportingly fastened with the crosspieces 16 are the conveyor trays 17 and 18 arranged in side-by-side relationship between the sidepieces 14 and extending in a longitudinal direction which is the conveying direction as shown in FIG. 2. It has been found best to provide more than one tray in order to maintain thermal expansion thereof within controllable limits. A shield 19, depicted in detail in FIG. 5, is connected to an upturned flange 21 of one conveyor tray, here shown as tray 17, to cover the space between the adjacent trays 17 and 18 and depend over the adjacent lip or flange 21 of the tray 18 with a lateral spacing sufficient to allow relative thermal expansion movement of the adjacent tray flanges 21 toward or away from one another. The deflector plates 22, FIG. 1, are attached to the side pieces 14 and are elongated in the conveying direction to cover the gap or space between the outer flanges 21 of the trays 17 and 18 and their correspondingly adjacent sidepieces 14. The shield 19 and the deflector plates 22 prohibit material conveyed on the trays 17 and 18 from falling beneath the trays.

The fastening of conveyor trays 17 and 18 to the longitudinally spaced underlying crosspieces 16 is illustrated best in FIGS. 1, 2A, 2B, 3 and 4. The crosspieces 16 preferably are hollow box beams which are open at their ends, and the hollow interior of the crosspiece, as shown in FIG. 1, communicates with the exterior of the conveyor 12 via apertures 23 through the sidepieces 14 which open into the hollow interior of the crosspiece 16. Fasteners 24 which are headed, such as bolts, pins, or the like, are passed through apertures 25 and 26 extending through overlapping ends of sheets 27 of steel, for example, as depicted in FIGS. 1, 2A and 2B. Suitable means, here shown as keys 28, are passed through slots suitable in the shank portion of the fasteners 24, and are accessible to be removably fixed to the fasteners via the apertures 23 in the sidepieces 14 and the hollow interior of the crosspiece 16. Additionally such keys or wedges 28 may be tightened as desired.

Each of the conveyor trays 17 and 18 are composed of a plurality of sheets 27 which overlap at their ends in assembled position. Corresponding apertures 25 are located symmetrically with the longitudinal centerline of the assembled tray 17 or 18, and the apertures 25 are aligned at their overlapping ends of the sheets 27 on a common axis which extends through similarly disposed apertures 29 in the upper wall of the crosspiece 16, FIGS. 1, 2A and 2B.

The aligned apertures 25 and 29 receive the fasteners 24 with an allowed tolerance between the apertures and the fastener so as to permit relative horizontal movement effectuated by thermal expansion between the sheets 27 so connected; however, the tolerance is slight enough that the forces of the vibrated masses of the conveyor 12 and material conveyed thereon is absorbed without chattering between the fasteners 24 and the fastened sheets 27, and without creeping or buckling of the joined sheets occasioned by thermal expansion.

The connected sheets 27 which comprise the trays 17 and 18 are maintained in their assembled position relative to side pieces 14 by rigid connections between one or more sheets 27 of each tray and an underlying crosspiece 16. In FIGS. 2A and 2B such connections may as shown be located, as indicated by apertures 26, at points equidistant and in longitudinal axial alignment with apertures 25 at the ends of the sheets 27. Accordingly, the apertures 26 may be symmetrical with the centerline of the tray 17, FIG. 2A. While a single aperture 26 at FIG. 2B is located equidistantly from the apertures 25, but lies on the approximate centerline of the conveyor tray 18. These apertures receive bolts 24, as shown in FIG. 1, to maintain the plates 27 against the underlying cross piece 16a and in engagement with stops secured to the cross piece 16a as hereinafter described and illustrated in FIGS. 3 and 4.

Referring now to FIGS. 3 and 4 of the drawing, showing in enlarged detail the means for maintaining one or more tray plates 27 of each tray in fixed relation to the members 14, FIG. 4 shows a cross section taken on lines IV—IV of FIG. 2A at such fixed connection with the underlying cross piece 16a. Plate 27, beneath aperture 26 therein, is reinforced by a plate member 37 secured to plate 27 in any suitable manner, as by welding. It will be noted that the underlying cross piece 16a of FIG. 4 is disposed in greater spaced relation to plate 27 than 16 in FIG. 1. Spaced transversely of cross piece 16a, and extending in a direction longitudinally thereof, are two upwardly extending plate members 36 which are suitably connected to 16a, as by welding. Overlying members 36 and secured thereto is plate member 35 which extends beyond members 36 in a direction longitudinally of the conveyor. Disposed adjacent one end of member 35 are stop members 32, 33 fixed to the underface of plate 27 and spaced outwardly from the opposite ends of member 5 are similar members 31, 33 secured beneath plate 27. A wedge shaped member 39 fills the space between member 31 and plate 35, for maintaining plate 27 in fixed relation to plate 35. FIG. 3 is a plan view of the above defined structure, with the plate 27 removed for clarity.

It will be observed from FIG. 2A that the above described stop connection between plate 27 and crosspiece 16 is duplicated, whereas in FIG. 2B only a single stop connection is shown. It will be apparent that two such stop connections may be provided for plate 27, FIG. 2B, if desired. It has been found in practice that each conveyor pan 17 and 18 will function as a unit with side pieces 14 when several stop connections are provided for each pan 17 and 18, but are not required for each sheet 27.

The crosspieces 16 may each be designed as illustrated in FIG. 1 wherein passages 41 are formed between the bottom wall of the crosspiece and aligned divider elements 42 which are suitably attached to the interior surfaces of the crosspieces 16. These passages open adjacent the center of the crosspieces 16 whereupon a coolant, such as air, will circulate from the exterior of the conveyor 12 inwardly from each end of the crosspieces 16, upwardly at the confluence of the streams of air at the center of the crosspiece, aided by convection currents created by heat of material on the trays 17 and 18, and outwardly toward each end of the crosspiece 16. Suitable means for directing a coolant through the crosspiece may be attached to the support structure 13 and fed through the ends of the crosspiece 16 which is open to the exterior through apertures 23 in the sidepieces 14 by nozzles or the like, not shown.

The present invention overcomes the deficiencies in known vibrating conveyors which are exposed in an operating environment to high temperatures at which thermal expansion of the materials of the conveyor occurs. By providing a fastening means to crosspieces which will permit thermal expansion between adjoining overlapped sheets which make up the conveyor tray while fixing the sheets against shifting from their aligned and assembled position with respect to one another, the effects of thermal expansion have been compensated for, thus eliminating the usual creeping of the tray material, and also the breakdown of the conveyor brought about by the loosening of connecting elements.

It is manifest that the above-described embodiment of the invention is merely illustrative and that numerous modifications may be made within the spirit and scope of the invention. Further, it will be understood that the particular hollow crosspiece illustrated is only an example of one design of hollow crosspiece which may be employed in making the invention, and that the invention is not limited to use with this one type of crosspiece.

What is claimed is:

1. A vibrating conveyor comprising elongated sidepieces supported for vibration, crosspieces fixedly connected at their ends to the sidepieces at spaced intervals, and sheets overlapped at their ends forming an elongated conveyor tray fastened onto the crosspieces and to one another at their ends, one connection fastening each sheet rigidly to a first crosspiece for locking the sheet in position with respect to the other sheets, and another connection fastening the ends of adjoining sheets slidably to one another and to a second crosspiece whereby compensation for expansion and contraction of the sheets is effected.

2. In a vibrating conveyor for conveying hot bulk materials, in combination,
   spaced side pieces defining the longitudinal length of the conveyor,
   spaced shallow crosspieces extending transversely between said sidepieces and connected thereto so as to provide free access to the interior of the crosspieces through said sidepieces,
   a material conveyor tray comprised of a plurality of sheets extending longitudinally of said sidepieces with the overlapped end of the sheets forming the tray receiving support upon said crosspieces,
   fastening means providing a connection between said overlapping ends of the tray sheets and each underlying crosspiece providing limited thermal expansion between said overlapped sheet ends and imparting vibration impulses from said sidepieces through said crosspieces to the tray supported thereon.

3. The vibrating conveyor as defined in claim 2 wherein said fastening means comprises,
   aligned apertures in the overlapping sheet ends and the apertures in said crosspieces,
   headed pins having a shank of sufficient length to extend through said aligned apertures in the sheets and crosspieces into the interior of said crosspieces, and
   an elongated aperture through said shank portion for reception of a wedge member disposed between the inner face of the crosspiece and the lower edge of said shank aperture imposing tension on said shank to draw the head portion thereof and said overlapped plates into engagement with the outer face of the crosspiece.

4. The vibrating conveyor as defined in claim 3, wherein, an additional crosspiece is connected between said sidepieces and beneath one said conveyor tray plate intermediate the ends thereof, and
   means connecting the overlying conveyor plate portion with said crosspiece preventing relative longitudinal movement between said plate portion and crosspiece.

5. The vibrating conveyor as defined in claim 4, wherein said means comprises,
   stop members secured to the underface of said plate portion in spaced relation longitudinally of said conveyor,
   stop members secured to and extending upwardly from the top face of the crosspiece into engagement with said plate portion stop members, and
   aligned apertures in said plate portion, crosspiece stop member and top face of the cross member receiving a fastener retaining the said stop members in vertical assembled relation.

6. The vibrating conveyor as defined in claim 3, wherein,
   said conveyor tray is comprised of two transversely spaced longitudinally extending similarly constructed portions whose overall width is less than the width between said sidepieces, and
   each said transversely spaced tray portion is connected to the said crosspieces in the same manner as is the single tray portion.

7. The vibrating conveyor as defined in claim 4, wherein the said conveyor tray is comprised of two spaced longitudinally extending similarly constructed portions whose overall width is less than the width between said sidepieces, and at least one additional crosspiece is disposed between said sidepieces and beneath the mid-portion of one said sheets, and means connecting the overlying conveyor tray plates with said additional crosspieces preventing relative longitudinal movement between said sheet portions and said crosspiece.

References Cited in the file of this patent
UNITED STATES PATENTS
2,665,798    Hagenbook _____ Jan. 12, 1954
FOREIGN PATENTS
424,107    Germany _____ Mar. 1, 1925
453,018    Germany _____ Nov. 26, 1927